Jan. 9, 1951   R. H. MUELLER   2,537,230
PACKING ASSEMBLY
Filed Dec. 27, 1946
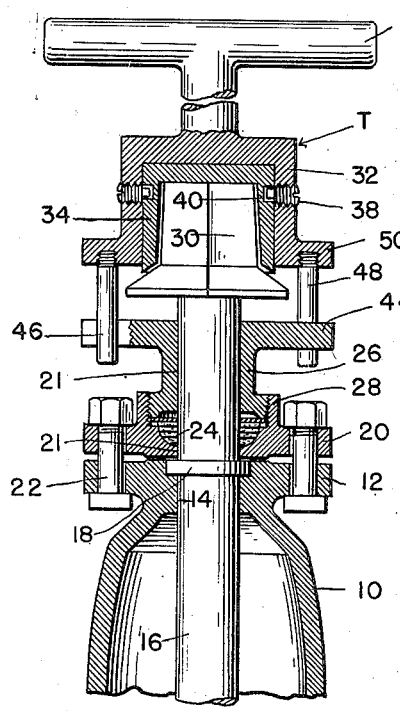
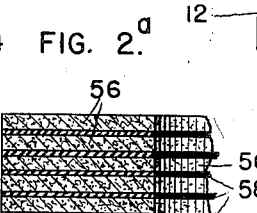
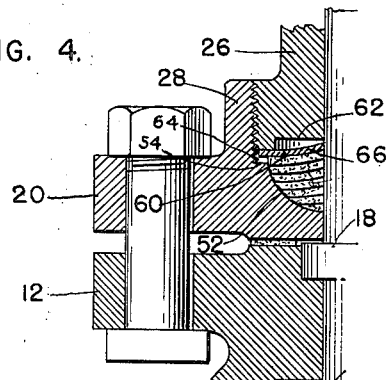
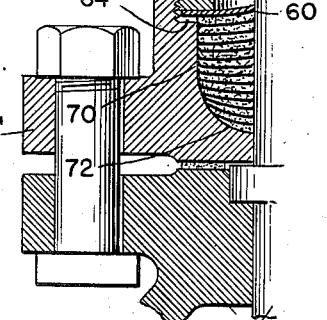
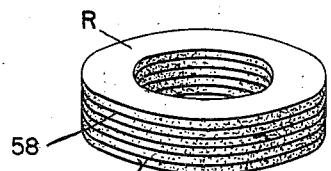
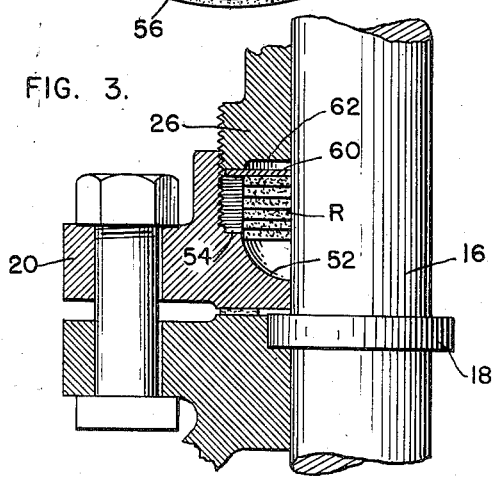
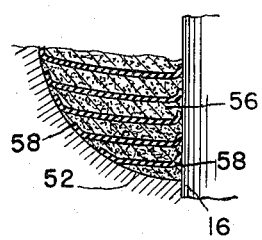
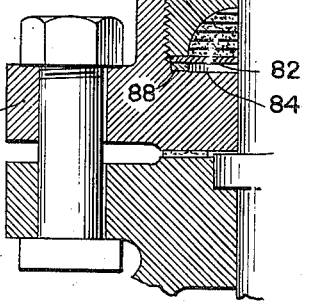
Inventor
ROBERT H. MUELLER
Cushman, Darby & Cushman
Attorneys Patented Jan. 9, 1951

2,537,230

UNITED STATES PATENT OFFICE 2,537,230

PACKING ASSEMBLY

Robert H. Mueller, Decatur, Ill., assignor to Mueller Co., Decatur, Ill., a corporation of Illinois Application December 27, 1946, Serial No. 718,753

4 Claims. (Cl. 286—30)

The present invention relates to a packing assembly for rods, shafts or the like, particularly such rods or shafts as are movable in a chamber containing fluid under pressure, the packing assembly being provided to retain the fluid within the chamber while permitting movement of the rod, stem or shaft.

The invention is particularly useful in connection with packing assemblies positioned around a valve stem. The drawings generally illustrate the use of the assembly in connection with a gate valve stem, but it will be obvious that the assembly could be usefully employed with other types of valve operating shafts or rods, such as in connection with the operating stems of fire hydrants and similar devices.

A principal object of the invention is to provide for the compression of packing material around the stem to be sealed by a resilient means specifically shown in the form of a resilient or flexible metal washer, which is flexed by the packing as the latter is compressed, in such manner that said washer continues to supply a powerful pressure against the compressed packing while in use. Ancillary to the preceding objective, it is a purpose of the invention to provide an arrangement of the type referred to above, wherein the action of fluid under pressure within the housing or chamber, and which may tend to escape around the valve stem or rod, has the effect, by its action on the packing, of increasing the pressure constantly applied by the flexible washer, whereby the packing is made tighter by any increase in the pressure of the fluid within the housing.

A further object of the invention is to provide a packing assembly of the type referred to above, wherein the pressure of the packing may be mechanically regulated, during the use of the assembly, by tightening a nut or follower against the flexible washer, in such manner as to increase its flexure and thus the pressure exerted by it on the packing material.

In the drawings, which are illustrative of several arrangements of the packing assembly, and of one particular use of the packing in connection with valves of the gate type:

Figure 1 is a vertical sectional view through the outer end of a valve housing, showing the over-all arrangement of one form of packing assembly, as well as a tool for adjusting the compression of the packing. The tool or wrench and associated parts are the subject matter of my separate application being filed of even date herewith, entitled "Equipment for Adjusting Packing and the Like."

Figure 2 is a view of the assembled and compressed packing ring employed in the assembly.

Figure 2a is a partial sectional view through the laminated packing shown in Figure 2.

Figure 3 is a partial sectional view of the assembly, showing the laminated packing being inserted into its receiving bowl or recess and prior to the compression of the packing.

Figure 4 is a sectional view, similar to Figure 3, of the packing assembly after the laminated packing ring has been compressed into the bowl.

Figure 5 is a view similar to Figure 4, of a modification of the assembly, useful for confining higher pressures, in which the packing receiving bowl or recess, and the laminated packing employed therein, are of a greater depth.

Figure 6 is a view similar to the preceding figures, wherein the packing is contained in a bowl or recess formed in a packing gland or follower, rather than in the housing of the valve or other similar member.

Figure 7 is an enlarged vertical sectional view through the packing ring of Figures 2 and 2a after the same has been compressed, and showing the relation of the packing laminations to the valve or other stem, particularly the manner in which the edges of the alternate rubber discs of the laminated packing tend to overlap the intermediate fabric layers of the ring, thus presenting a substantially solid rubber contact with the surface of the valve or other stem and with the interior wall of the recess or bowl.

In Figure 1, which is a view appearing in my co-pending application referred to, the housing or body of a valve or the like is shown at 10, having an outer flanged end 12 through which there is an opening 14 for the valve stem 16. The valve stem may be of the conventional non-rising type, having a collar 18 which is retained or gripped in a recess in the outer face of the flange 12 by a second flanged member 20, the latter having a similar bore 21 for the extending end of the valve stem. The flanged member 20 is bolted to the flange 12 by the conventional bolts 22, and it has a cup-like packing recess 24 in its outside face, the packing being compressed in the recess by a gland nut 26 which is threaded into an outer cylindrical extension 28 of the flanged member 20, as generally described in the said co-pending application.

The valve stem has a square or other form of polygonal head 30, which is primarily adapted to receive a wrench to turn the valve between open and closed positions. This head also serves as a positioning and supporting member for the tool end T of a wrench which comprises an outside working cup 32 and an inside guiding sleeve 34. The sleeve 34 is interiorly formed to the shape of the head 30, such as by being substantially square in cross section, and is cylindrical on its outer surface to turn freely in the working cup 32, the sleeve being held against dislodgement by threaded pins 38 in said cup which have heads or ends entering a circular channel 40 in the exterior of the sleeve, all as described in my co-pending application.

The gland nut has radially extending arms 44 and 46, whereby wrench prongs 48 depending from the flange 50 of the working cup 32 may operate the gland nut to compress the packing as described in that application.

Referring to Figure 4, the packing recess in the outer flange 20 is shown as having a curved or bowl-like wall 52, which tapers inwardly from a ledge 54 toward the valve stem 16. In the design shown, the wall of the recess is formed on substantially the arc of a circle. It is in this recess that the packing is compressed by the follower 26, being distorted in such manner as to be self-adjusting or self-regulating, and to mechanically increase its pressure upon increase of pressure of fluid within the chamber or valve 10.

As shown in Figures 2 and 2a, the packing is made up in a ring R, which is rectangular in section, there being alternate layers 56 and 58 of different types of packing material, such as relatively thick fabric packing material discs 56 and relatively thin rubber discs 58, which are suitably pressed and bonded together and are dipped in and impregnated with hot tallow or other lubricating substance to prevent them from becoming dry when the packing is in storage or in use. The packing ring may be made up in two sections, to facilitate its being positioned around the valve stem, or the valve stem head may be removable as by being pinned on the end of the stem to permit mounting of the packing, flange member 20, gland nut 44 and the resilient washer now to be described.

Turning now to Figure 3, the packing ring R is initially placed in the recess 52 around the stem and it is obvious that the ring is initially of considerably greater volume than the recess. Disposed outwardly of the packing ring is a metal disc or washer 60 of resilient material and design. This washer is of such material and strength that it has a high degree of elasticity and when flexed outwardly adjacent its center, it will retain a constant and powerful tendency to return to its plane as in Figure 3, thus exerting pressure on the packing as hereinafter described. The washer 60 is of a diameter somewhat greater than the diameter of the packing ring R, so that a portion of its area adjacent its perimeter extends out over the ledge 54 of the flanged member 20, and it is against the outer side of this perimeter surface that the forward face of the gland nut 26 acts. The forward face of the gland nut is recessed to a substantial depth as at 62, this recess generally extending from the stem 16 outwardly to a point directly over or in line with the inner edge of the ledge 54.

After the packing has been arranged in the recess shown in Figure 3, the gland nut 26 is tightened to thus wedge or distort the packing downwardly into the curved recess cavity, causing the packing to be deformed to the cross-sectional shape of the recess.

It will be observed in Figure 4 that the gland nut need not be tightened to such an extent as to force the packing into the recess below the ledge 54, in fact, it is preferable for the packing to at least be initially adjusted so that its outer surface extends above said ledge, thus leaving a space 64 between the outer edge surface of the washer and the ledge, so that the gland nut may be further tightened during use of the equipment to increase the tension on the washer to take up any wear which may have occurred. It will be noted in Figure 4 that when the gland nut has been threaded inwardly to such an extent as to leave a space 64 within the washer 60 which is substantially equal to the width of said washer, the central part of the washer is sprung outwardly as at 66, but not to its elastic limit, so that the washer maintains a constant powerful pressure against the packing to wedge it tightly against the valve stem 16, as well as against the surface 52 of the packing recess. In fact, by reason of the dimensions of the parts, including the packing, whereby a space 64 is left when the gland nut is threaded up to an extent tight enough for use, the washer 60 is applying pressure on the packing throughout the entire radial surface of the packing from the stem 16 to the sides of the bowl 52. It will be noted that the recess 62 in the forward face of the gland nut 26 permits the resilient washer 60 to flex outwardly as shown. The depth of the recess 62 will depend on the flexibility of the washer 60 and should be great enough to permit this washer to flex outwardly as far as necessary.

As shown in Figure 7, the inner and outer edges of the rubber discs 58 of the packing tend to become expanded or stretched out around the edges of the fibre laminations of packing 56, so that substantially an unbroken rubber surface is presented to the valve stem 16 and to the surface 52 of the bowl of the packing recess.

With the packing under compression as shown in Figure 4, and when the pressure within the housing is increased as by opening the valve, any pressure of fluid which can pass outwardly around the stem 16 engages the packing and exerts an outward pressure on said packing, but this outward pressure only tends to increase the flexure of the resilient spring washer 60 which in turn increases the mechanical pressure of the packing inwardly toward the stem and against the bowl 52, thus giving the assembly a self-regulating characteristic against variations in the pressure to be controlled. As the parts become worn, the packing may be tightened by setting up on the gland nut 26 in the manner disclosed in Figure 1 and referred to in my co-pending application.

A variation of the invention is disclosed in Figure 5, which might be applicable for use in the control of higher pressures. In this view, the outer flange member 20' is provided with a recess comprising a somewhat deep substantially cylindrical portion 70 terminating in an inner portion 72 of curved configuration and cross-section, the depth of the recess in this embodiment is somewhat greater than the depth shown in Figure 4, being almost on the order of twice as deep. In this case, the packing ring is formed to a thickness corresponding with the depth of the recess, but the manner of its compression in the recess would be generally the same, and as illustrated in Figure 5.

In Figure 6, a further modification is shown in which the packing recess 80 is provided in a modified type of gland nut 26'. The flexible washer 82 retains the packing in the recess 80 in the same manner, and may be bent inwardly adjacent its center to maintain compression on the packing as previously described, there being a recess 84 in the outer face of the gland member 86. To prevent leakage through the threads of the gland nut 26', a further packing washer 88 should be provided on the ledge of the member 86 around the recess 84. The operation of this assembly, in the compression of the packing, and bending of the washer, is generally the same as in the preferred embodiments of the invention. Pressure within the housing does tend to tighten the packing, but mechanical adjustment of the packing is inferior to that provided in the preferred embodiments.

Various changes of the structure shown herein are evident. For large sizes of valves, the gland follower may have a flange and bolt connection, instead of the threads shown, but will be capable of tightening to mechanically regulate the compression of the packing. While the tapered shape of the packing recess may be varied, in all forms of the assembly it should be such as to direct pressure against the shaft, and its inwardly decreasing radius serves to permit the packing to be tightly wedged toward the lower end of the recess. The resilient washer 60 is preferably made of phosphor bronze, although it could be made of steel and cadmium plated to make it non-corrosive.

I claim:

1. Equipment of the character described comprising a housing having a bore therethrough, a stem extending from said housing through said bore, packing means in the outer end of said bore and around said stem which is self-regulating against the pressure of fluid in said housing, said means comprising a recess in said housing having an open end, said housing being formed with a ledge or shoulder surrounding the open end of said recess, said recess tapering from its outer open end toward said stem and a packing ring in said recess formed of non-rigid material which assumes the shape of and fills said recess when compressed therein, said packing ring being of sufficient volume when compressed to extend beyond the open end of said recess, a resilient annular metal washer surrounding said stem and engaging the protruding surface of said packing ring adjacent the center of said washer, the surface of said washer adjacent its edge extending outwardly beyond said packing and over said ledge or shoulder, and a packing compressing gland having means for adjusting same with respect to said housing inwardly toward said recess, said gland having an outer annular surface which forces the edge area of said washer inwardly toward the rim or shoulder of said housing, whereby the protruding portion of the packing ring flexes the central portion of said washer outwardly when the packing is compressed, the resilience of the washer maintaining the compression of the packing ring during the use of the equipment, said gland having a central depression in its forward face positioned outwardly of the central edge of said washer to permit the control portion thereof to be flexed outwardly during the compression of the packing ring.

2. Equipment of the character described comprising a housing having a bore therethrough, a stem extending from said housing through said bore, packing means in the outer end of said bore which is self-regulating against the pressure of fluid in said housing, said means comprising a recess tapering from an outer open end toward said stem, said housing being formed to provide a rim around the open end of said recess, a gland nut connected for adjustment toward said recess, a packing ring in said recess around said stem formed of non-rigid material which assumes the shape of and fills said recess when compressed therein, a resilient washer bearing against said packing ring adjacent its center and being engaged by the forward end of said gland nut in an area around the rim of said washer, said packing ring being of such volume as to extend beyond the open end of said recess and spring the central area of said washer outwardly to maintain compression on said packing ring, the forward face of said gland nut having a central depression to provide for the outward flexure of said washer, the outer edge area of said washer being spaced from the rim of said housing surrounding said recess.

3. Equipment of the character described comprising a housing having a bore therethrough, a stem extending through said bore, said bore being enlarged to provide a packing recess tapering from an outer open end toward said stem, and a packing ring of non-rigid material originally formed of rectangular cross section compressed into said recess by a gland follower adjustably connected to said housing, said packing ring when compressed assuming the shape of and filling said recess, there being a resilient washer engaging the outer end portion of the packing in said recess, said gland follower having a forward face bearing against said washer near its rim and having a central recess to provide for bending of the center of said washer outwardly, whereby to maintain regulated compression on said packing.

4. Equipment of the character described comprising a housing having a bore therethrough, a stem extending through said bore, said bore being enlarged to provide a packing recess formed by a bowl-like surface tapering from an outer open end toward said stem, a packing ring in said recess originally formed of alternate discs of rubber-like and fabric-like substances disposed in planes substantially normal to the axis of said stem, a gland follower adjustably connected to said housing having a forward face whose inward movement exerts pressure on said packing to deform same to the shape of said bowl recess and stem and to distort the material of said discs from said planes, the outer and inner edges of said rubber discs being forced beyond the corresponding edges of said fabric discs and stretched against the surface of said stem and bowl upon deformation of said packing, to provide sealing rubber contact against said stem and bowl when said packing is compressed in the latter.

ROBERT H. MUELLER.

REFERENCES CITED

The following references are of record in the file of this patent:

UNITED STATES PATENTS

| Number | Name | Date |
|---|---|---|
| 43,950 | Miller | Aug. 23, 1864 |
| 410,918 | Philper | Sept. 10, 1889 |
| 1,015,685 | Kahle | Jan. 23, 1912 |
| 1,546,106 | Rice | July 14, 1925 |
| 1,550,322 | Ostrander | Aug. 18, 1925 |
| 2,401,379 | Smith | June 4, 1946 |

FOREIGN PATENTS

| Number | Country | Date |
|---|---|---|
| 29,719 | Great Britain | of 1913 |